United States Patent
Lin

(10) Patent No.: US 9,956,606 B1
(45) Date of Patent: May 1, 2018

(54) QUICK-DISASSEMBLE SNAPPING DEVICE OF A RIVET GUN

(71) Applicant: Yu-Tang Lin, New Taipei (TW)

(72) Inventor: Yu-Tang Lin, New Taipei (TW)

( * ) Notice: Subject to any disclaimer, the term of this patent is extended or adjusted under 35 U.S.C. 154(b) by 0 days. days.

(21) Appl. No.: 15/825,663

(22) Filed: Nov. 29, 2017

(51) Int. Cl.
| | |
|---|---|
| *B21J 15/34* | (2006.01) |
| *B21J 15/38* | (2006.01) |
| *F16L 37/098* | (2006.01) |
| *B21J 15/12* | (2006.01) |
| B21J 15/10 | (2006.01) |
| B21J 15/04 | (2006.01) |

(52) U.S. Cl.
CPC ............... *B21J 15/38* (2013.01); *B21J 15/12* (2013.01); *B21J 15/34* (2013.01); *F16L 37/0985* (2013.01); *B21J 15/043* (2013.01); *B21J 15/105* (2013.01)

(58) Field of Classification Search
CPC ... B21J 15/38; B21J 15/12; B21J 15/34; B21J 15/043; B21J 15/105; F16L 37/0985
USPC ................................... 29/243.521
See application file for complete search history.

(56) References Cited

U.S. PATENT DOCUMENTS

| | | | | |
|---|---|---|---|---|
| 2,845,826 A | * | 8/1958 | Harcourt | B21J 15/32 72/404 |
| 4,552,010 A | * | 11/1985 | Hein | B21J 15/022 29/243.528 |
| 4,648,259 A | * | 3/1987 | Pendleton | B21J 15/043 279/56 |
| 5,361,474 A | * | 11/1994 | Yang | B21J 15/043 29/243.527 |
| 5,603,151 A | * | 2/1997 | Wille | B21J 15/043 29/243.528 |
| 7,331,205 B2 | * | 2/2008 | Chitty | B21J 15/043 227/2 |

* cited by examiner

*Primary Examiner* — David B Jones
(74) *Attorney, Agent, or Firm* — Browdy and Neimark, PLLC

(57) ABSTRACT

A quick-disassemble snapping device of a rivet gun has a front sleeve, a rear sleeve, a snapping assembly, and a retaining assembly. The front sleeve has multiple positioning recesses. The rear sleeve is coaxially connected with the front sleeve and has at least one mounting recess. The snapping assembly is mounted in the front sleeve and the rear sleeve. The retaining assembly has a locking ring. The locking ring is mounted around the rear sleeve and has at least one engaging tooth mounted through the at least one mounting recess of the rear sleeve and engaging in at least one of the positioning recesses of the front sleeve. The quick-disassemble snapping device can be used in a pneumatic, manual, or electric rivet gun and has a stable structure. No tool is needed for disassembling the snapping device and the snapping device can be easily disassembled to be cleaned.

6 Claims, 7 Drawing Sheets

QUICK-DISASSEMBLE SNAPPING DEVICE OF A RIVET GUN

BACKGROUND OF THE INVENTION

1. Field of the Invention

The present invention relates to a snapping device, especially to a quick-disassemble snapping device that is used in a pneumatic, manual, or electric rivet gun and can be easily disassembled to be cleaned.

2. Description of the Prior Art(s)

A rivet is a kind of fastener that can hold at least two working pieces together and includes a mandrel and a rivet body mounted on an end of the mandrel. A hole is drilled through each of the working pieces and the rivet body is mounted through the holes of the working pieces. A rivet gun holds and pulls the mandrel, causing the rivet body to deform and hold the working pieces between a flange of the rivet body and a deformed portion of the rivet body.

With reference to FIG. 6, a pneumatic rivet gun 60 comprises a handle 61, a pneumatic cylinder 62, a barrel 63, a trigger 64, and a conventional snapping device 65. The pneumatic cylinder 62 is mounted to a lower end of the handle 61. An air pressure piston 66 is mounted in the pneumatic cylinder 62. The barrel 63 is mounted to an upper end of the handle 61. A hydraulic piston 67 is mounted in the barrel 63 and is disposed at a middle of the barrel 63. The trigger 64 is mounted on the handle 61. The conventional snapping device 65 is mounted in a front end of the barrel 63. A chamber defined above the air pressure piston 66 and in the handle 61 is filled with hydraulic oil. A lower end of the pneumatic cylinder 62 is connected to a high pressure source, so as to input high pressure air into a chamber defined below the air pressure piston. Thus, when the mandrel of the rivet is held by the conventional snapping device 65 and the trigger 64 is pressed, the high pressure air is input into the chamber defined below the air pressure piston and pushes the air pressure piston to move upward. Accordingly, the hydraulic oil above the air pressure piston is pushed to flow into the barrel 63 and to push the hydraulic piston 37 and the conventional snapping device 65 in the barrel 63 to move toward a rear end of the barrel 63 to snap the mandrel of the rivet.

With further reference to FIG. 7, the conventional snapping device 65 includes a front sleeve 651, a rear sleeve 652, and a snapping assembly 653. The front sleeve 651 has an inner thread 6511 formed on an inner sidewall of the front sleeve 651 and disposed at a rear end of the front sleeve 651. The rear sleeve 652 has an outer thread 6521 formed on an outer sidewall of the rear sleeve 652 and disposed at a front end of the rear sleeve 652. The front end of the rear sleeve 652 protrudes into the rear end of the front sleeve 651 and the outer thread 6521 engages with the inner thread 6511. The snapping assembly 653 is mounted in the front sleeve 651 and the rear sleeve 652 and is capable of vise the mandrel, so as to pull the mandrel toward the rear end of the barrel 63 and to snap the mandrel. As the mandrel is snapped, metal scraps are produced. Therefore, a user of the rivet gun has to remove the conventional snapping device 65 from the barrel 63 occasionally and disassemble the front sleeve 651 and the rear sleeve 652, so as to clean up the metal scraps in the front sleeve 651 and the rear sleeve 652.

In order to avoid loosening, the front sleeve 651 and the rear sleeve 652 have to tightly engage with each other. Thus, when cleaning the conventional snapping device 65, a wrench is needed for disassembling and assembling the front sleeve 651 and the rear sleeve 652. However, since the wrench is not an essential tool for using the rivet gun, the user would be unable to clean the conventional snapping device 65 if the user does not have said wrench at hand.

To overcome the shortcomings, the present invention provides a quick-disassemble snapping device of a rivet gun to mitigate or obviate the aforementioned problems.

SUMMARY OF THE INVENTION

The main objective of the present invention is to provide a quick-disassemble snapping device of a rivet gun. The snapping device has a front sleeve, a rear sleeve, a snapping assembly, and a retaining assembly.

The front sleeve has multiple positioning recesses and an inner thread. The positioning recesses are separately formed in a rear end edge of the front sleeve. The inner thread is formed on an inner sidewall of the front sleeve.

The rear sleeve is coaxially connected with the front sleeve and has an outer flange, at least one mounting recess, and an outer thread. The outer flange is formed on and around an outer sidewall of the rear sleeve. The at least one mounting recess is formed in an outer peripheral edge of the outer flange. The outer thread is formed on the outer sidewall of the rear sleeve and engages with the inner thread of the front sleeve.

The snapping assembly is mounted in the front sleeve and the rear sleeve.

The retaining assembly has a locking ring, a stop ring, and an outer spring. The locking ring is mounted around the rear sleeve and has at least one engaging tooth mounted through the at least one mounting recess of the rear sleeve and engaging in at least one of the positioning recesses of the front sleeve. The stop ring is stationarily mounted around the rear sleeve. The outer spring is a compression spring, is mounted around the rear sleeve, and has two opposite ends respectively abutting against the locking ring and the stop ring.

The quick-disassemble snapping device can be used in a pneumatic, manual, or electric rivet gun. With the outer spring pushing the locking ring to allow the at least one engaging tooth of the locking ring to mounted through the at least one mounting recess of the rear sleeve and to engage in at least one of the positioning recesses of the front sleeve, a relative position of the front sleeve and the rear sleeve can be held. Therefore, the front sleeve and the rear sleeve does not rotate relative to each other, and the quick-disassemble snapping device has a stable structure.

When disassembling the front sleeve and the rear sleeve, the locking ring is pulled towards the rear end of the rear sleeve to allow the at least one engaging tooth of the locking ring to disengage from at least one of the positioning recesses of the front sleeve. Then the rear sleeve can be rotated relative to the front sleeve, so as to disengage the outer thread of the rear sleeve from the inner thread of the front sleeve, and then the front sleeve and the rear sleeve can be cleaned. No tool, such as a wrench, is needed for disassembling the snapping device and the snapping device can be easily disassembled to be cleaned.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
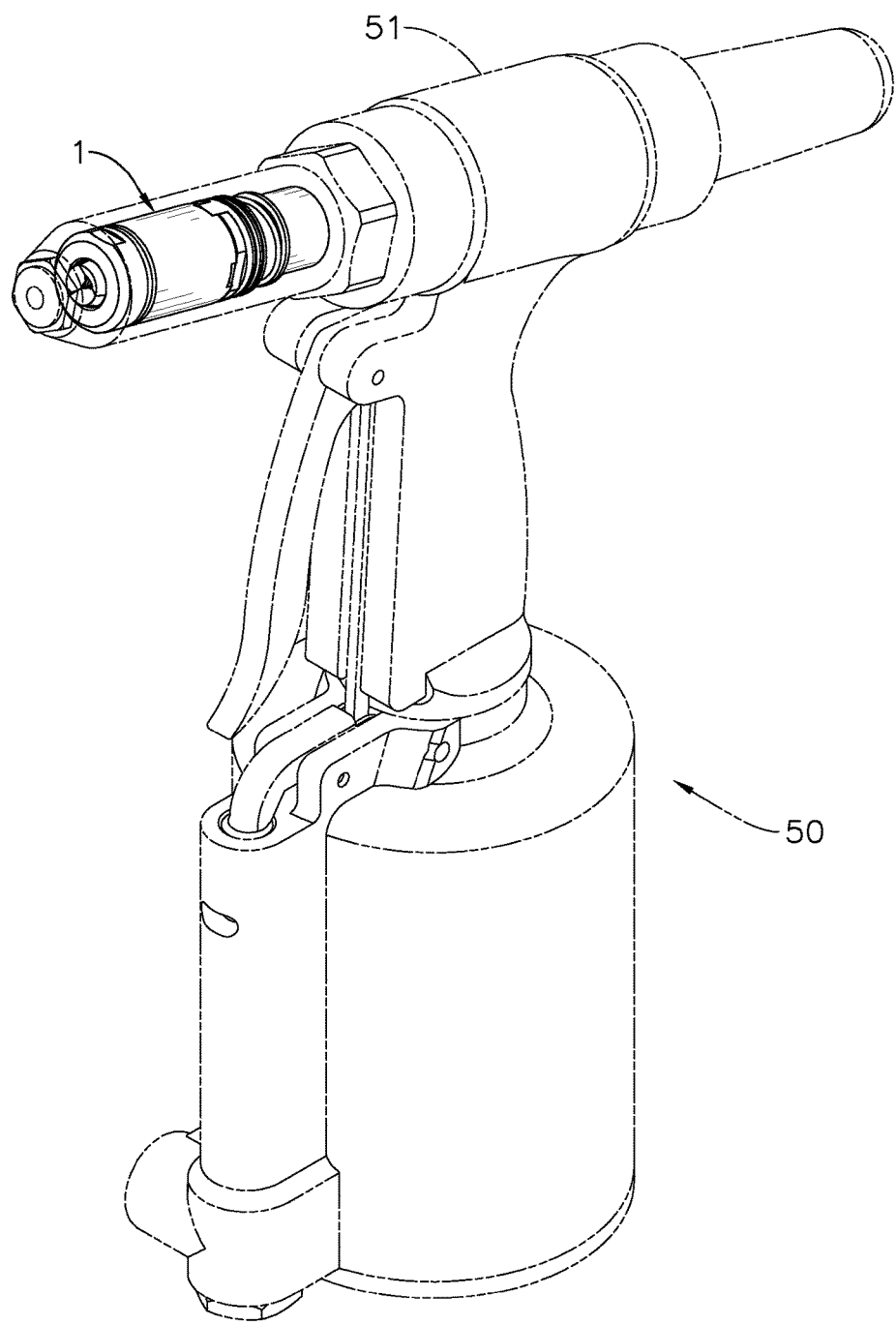
FIG. 1 is a perspective view of a quick-disassemble snapping device in accordance with the present invention, wherein the snapping device is shown mounted in a rivet gun.
Figure 2:
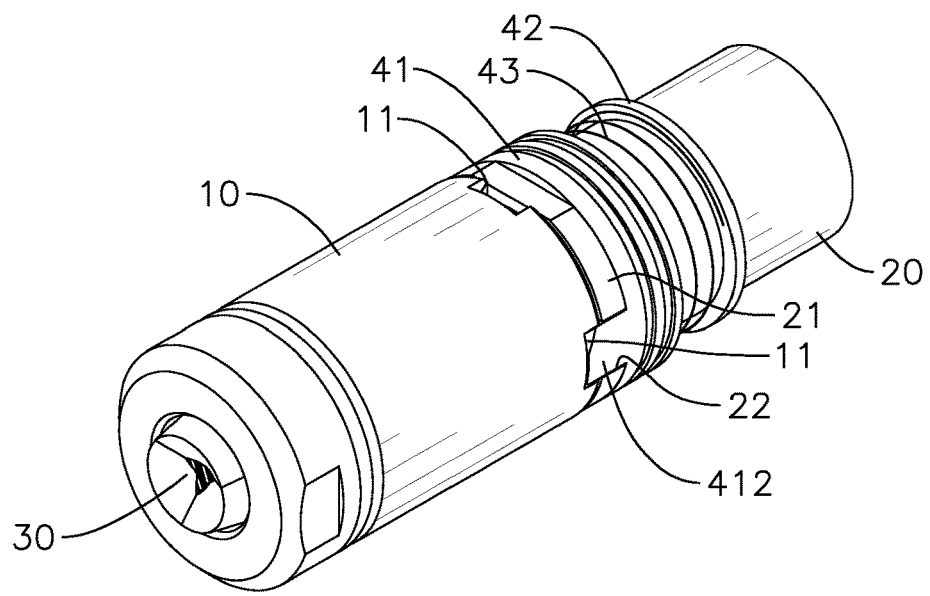
FIG. 2 is a perspective view of the snapping device in FIG. 1.
Figure 4:
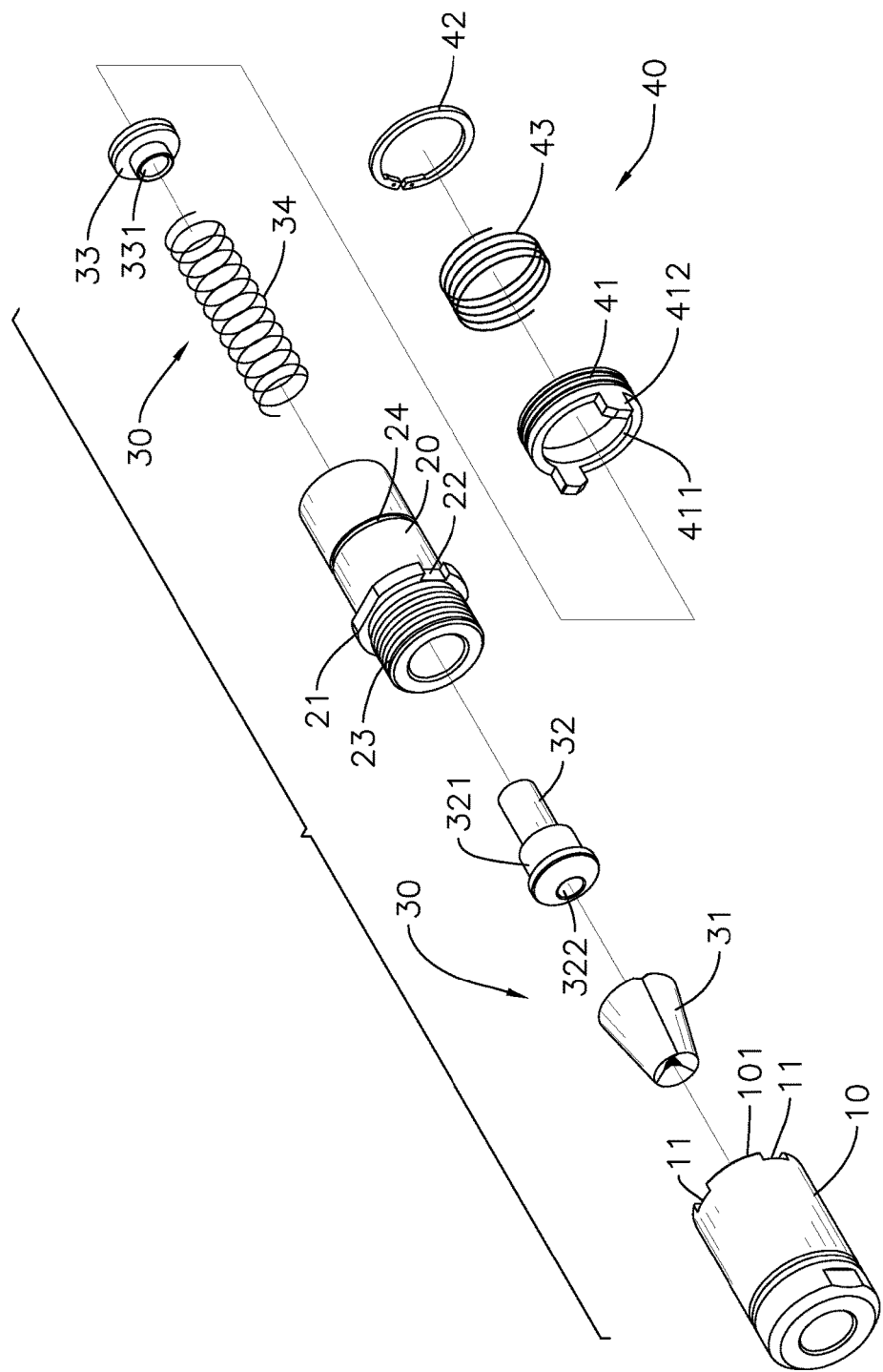
FIG. 4 is an exploded perspective view of the snapping device in FIG. 1.

With reference to FIGS. 1, 2, and 4, the quick-disassemble snapping device 1 in accordance with the present invention is mounted in a front end of a barrel 51 of a rivet gun 50. In the preferred embodiment, the rivet gun 50 is pneumatic. In addition, the rivet gun 50 may be manual or electric. The quick-release snapping device 1 comprises a front sleeve 10, a rear sleeve 20, a snapping assembly 30, and a retaining assembly 40.

Figure 5:
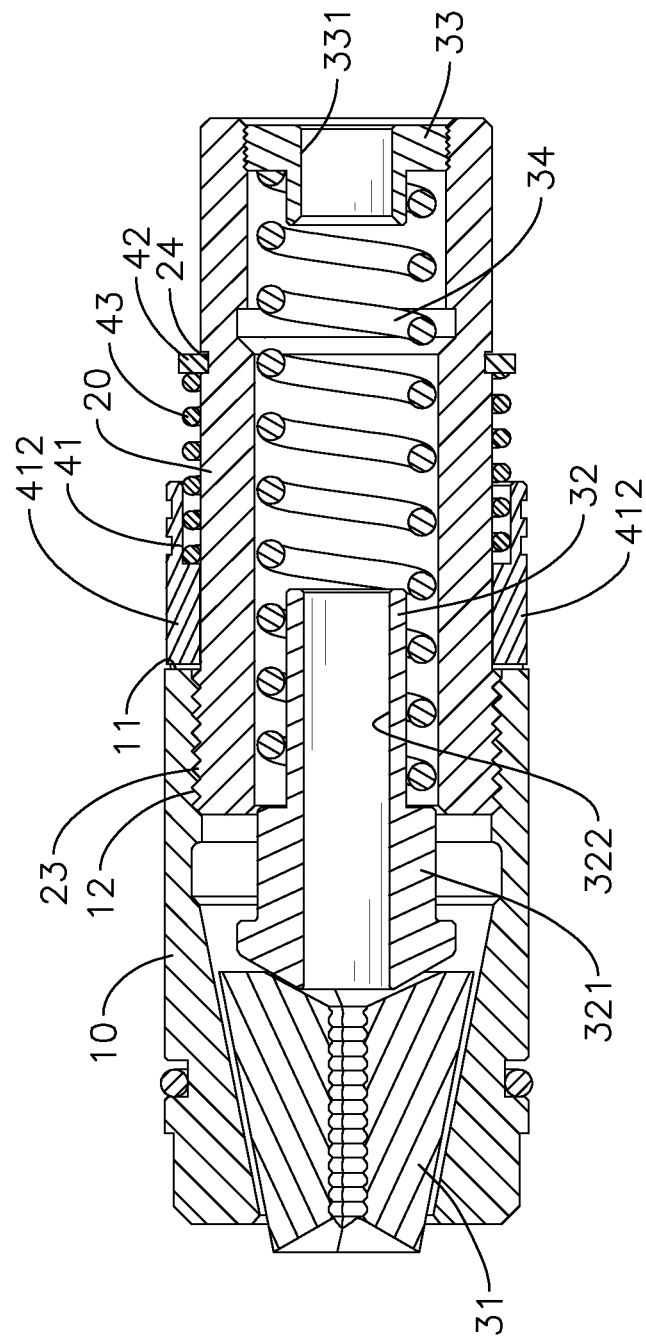
FIG. 5 is a cross-sectional side view of the snapping device in FIG. 1.
Figure 6:
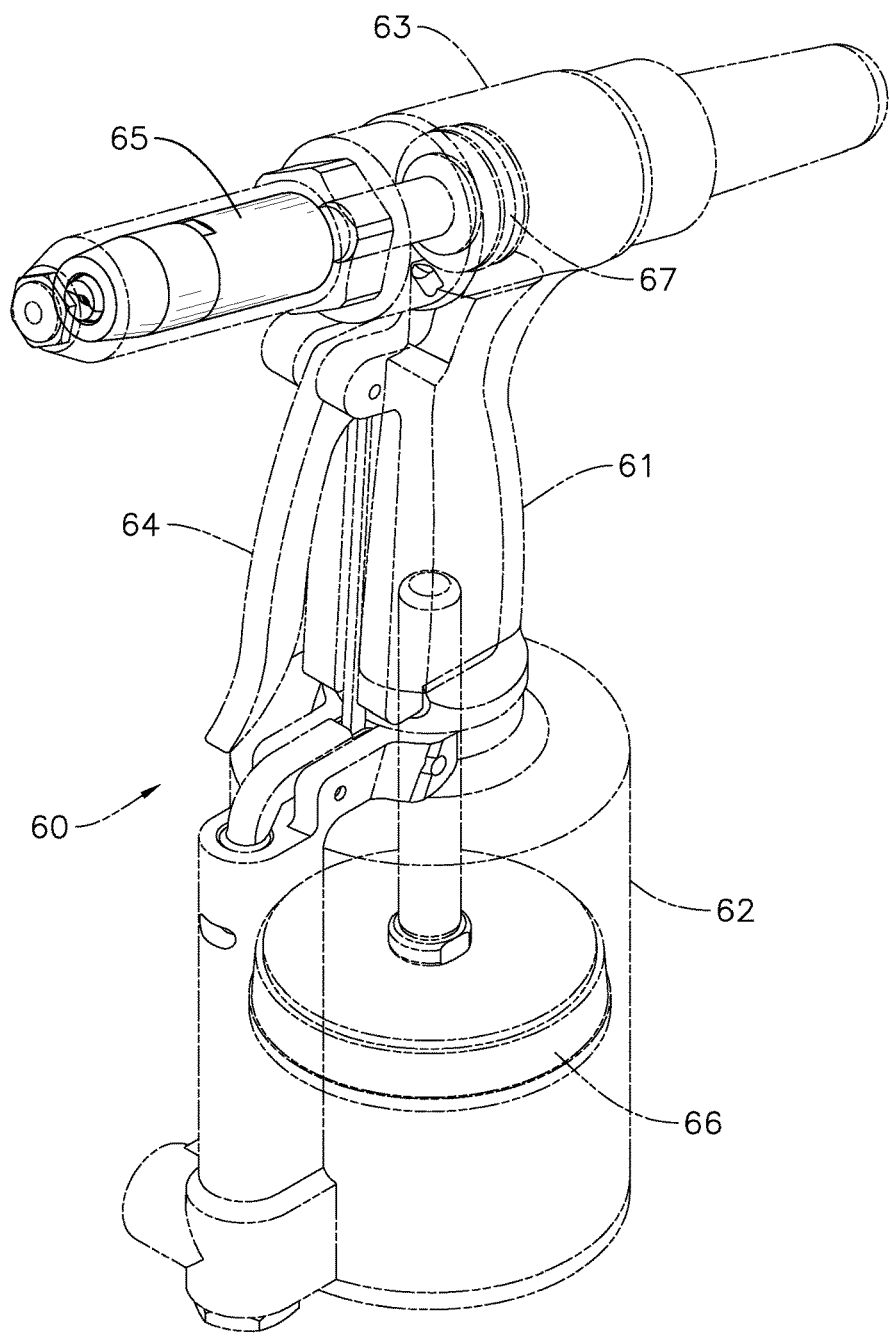
FIG. 6 is an operational perspective view of a conventional snapping device in accordance with the prior art, wherein the snapping device is shown mounted in a rivet gun.
Figure 7:
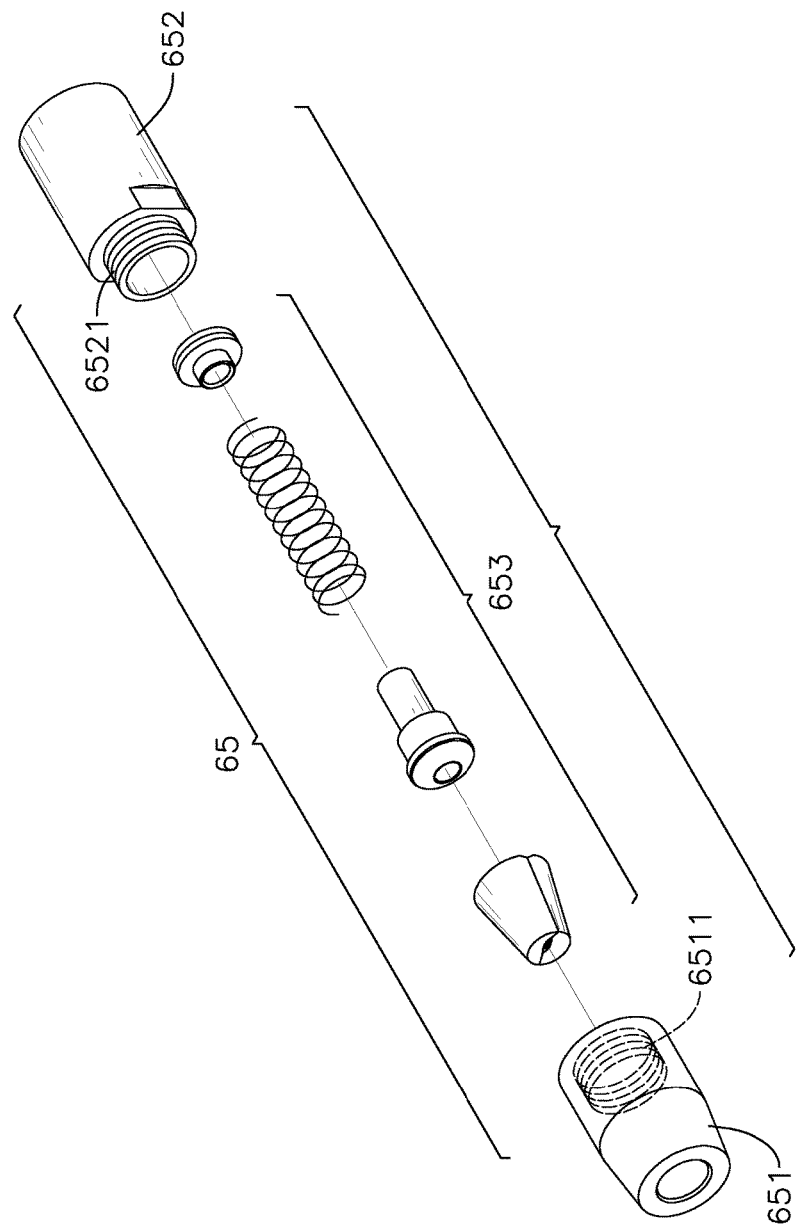
FIG. 7 is an exploded perspective view of the conventional snapping device in FIG. 6.

With further reference to FIG. 5, the front sleeve 10 has a front end, a rear end, an inner sidewall, a rear end edge 101, multiple positioning recesses 11, and an inner thread 12. The positioning recesses 11 are separately formed in the rear end edge 101 of the front sleeve 10. Each of the positioning recesses 11 axially extends. The inner thread 12 is formed on the inner sidewall of the front sleeve 10 and is disposed at the rear end of the front sleeve 10.

The rear sleeve 20 is coaxially connected with the front sleeve 10 and has a front end, a rear end, an outer sidewall, an outer flange 21, at least one mounting recess 22, an outer thread 23, and an annular groove 24.

The front end of the rear sleeve 20 protrudes into the rear end of the front sleeve 10. The outer flange 21 is formed on and around the outer sidewall of the rear sleeve 20, radially extends, and has an outer peripheral edge. The at least one mounting recess 22 is formed in the outer peripheral edge of the outer flange 21. Each of the at least one mounting recess 22 radially extends and corresponds in position to one of the positioning recesses 11 of the front sleeve 10.

The outer thread 23 is formed on the outer sidewall of the rear sleeve 20, is disposed between the outer flange 21 and the front end of the rear sleeve 20, and engages with the inner thread 12 of the front sleeve 10, such that the rear sleeve 20 and the front sleeve 10 are connected with each other. The annular groove 24 is formed in and around the outer sidewall of the rear sleeve 20 and is disposed between the outer flange 21 and the rear end of the rear sleeve 20.

The snapping assembly 30 is mounted in the front sleeve 10 and the rear sleeve 20 and includes a jaw set 31, a guiding rod 32, a stopper 33, and an inner spring 34.

The jaw set 31 is mounted in the front sleeve 10 and is disposed at the front end of the front sleeve 10. The jaw set 31 includes multiple jaws.

The guiding rod 32 is mounted in the front sleeve 10 and the rear sleeve 20 and has a front end, a rear end, a head portion 321, and a mounting channel 322. The front end of the guiding rod 32 protrudes in the front sleeve 10. The rear end of the guiding rod 32 protrudes in the rear sleeve 20. The head portion 321 is formed on the front end of the guiding rod 32 and abuts the jaw set 31. The mounting channel 322 is axially defined in the guiding rod 32 and is formed through the front end of the guiding rod 32 and the rear end of the guiding rod 32.

The stopper 33 is mounted in the rear sleeve 20, is disposed at the rear end of the rear sleeve 20, and has a through hole 331. The through hole 331 is axially defined through the stopper 33 and aligns with the mounting channel 322 of the guiding rod 32. Specifically, the stopper 33 is abutted and pushed by a piston rod that is mounted in the barrel 51 of the rivet gun 50, so that the stopper 33 can be maintained in the rear sleeve 20.

The inner spring 34 is a compression spring, is mounted in the rear sleeve 20, and is mounted around the rear end of the guiding rod 32. The inner spring 34 has two opposite ends respectively abutting against the head portion 321 of the guiding rod 32 and the stopper 33.

The retaining assembly 40 is mounted around the outer sidewall of the rear sleeve 20 and is disposed between the outer flange 21 and the rear end of the rear sleeve 20. The retaining assembly 40 includes a locking ring 41, a stop ring 42, and an outer spring 43.

The locking ring 41 is mounted around the rear sleeve 20 and has a front end edge 411 and at least one engaging tooth 412. The front end edge 411 of the locking ring 41 faces toward and abuts the outer flange 21 of the rear sleeve 20. The at least one engaging tooth 412 axially protrudes from the front end edge 411 of the locking ring 41. Each of the at least one engaging tooth 412 is mounted through a corresponding one of the at least one mounting recess 22 of the rear sleeve 20 and engages in the positioning recess 11 that corresponds in position to the corresponding one of the at least one mounting recess 22.

The stop ring 42 is stationarily mounted around the rear sleeve 20 and engages in the annular groove 24 of the rear sleeve 20. Specifically, the stop ring 42 may be a C-clip.

The outer spring 43 is a compression spring, is mounted around the rear sleeve 20, and is disposed between the locking ring 41 and the stop ring 42. The outer spring 43 has two opposite ends respectively abutting against the locking ring 41 and the stop ring 42, such that each of the at least one engaging tooth 412 of the locking ring 41 stably engages in the positioning recess 11 that corresponds in position to the corresponding one of the at least one mounting recess 22.

As shown in FIG. 2, the quick-disassemble snapping device 1 as described has the following advantages. With the outer spring 43 pushing the locking ring 41 to allow the at least one engaging tooth 412 of the locking ring 41 to mounted through the at least one mounting recess 22 of the rear sleeve 20 and to engage in at least one of the positioning recesses 11 of the front sleeve 10, a relative position of the front sleeve 10 and the rear sleeve 20 can be held. Therefore, the front sleeve 10 and the rear sleeve 20 does not rotate relative to each other, and the quick-disassemble snapping device 1 has a stable structure.

Figure 3:
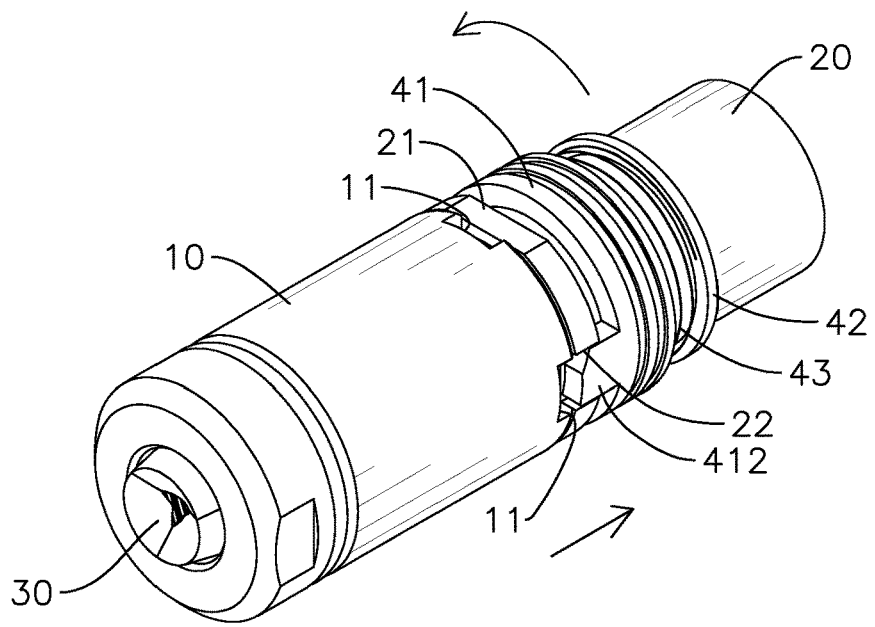
FIG. 3 is an operational perspective view of the snapping device in FIG. 1.

With further reference to FIG. 3, when disassembling the front sleeve 10 and the rear sleeve 20, the locking ring 41 is pulled towards the rear end of the rear sleeve 20 to allow the at least one engaging tooth 412 of the locking ring 41 to disengage from at least one of the positioning recesses 11 of the front sleeve 10. Then the rear sleeve 20 can be rotated relative to the front sleeve 10, so as to disengage the outer thread 23 of the rear sleeve 20 from the inner thread 12 of the front sleeve 10, and then the front sleeve 10 and the rear sleeve 20 can be cleaned. No tool, such as a wrench, is needed for disassembling the snapping device 1 and the snapping device 1 can be easily disassembled to be cleaned.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A quick-disassemble snapping device of a rivet gun comprising:
    a front sleeve having
        a rear end edge;
        multiple positioning recesses separately formed in the rear end edge of the front sleeve, and each of the positioning recesses axially extending; and
        an inner thread formed on an inner sidewall of the front sleeve and disposed at a rear end of the front sleeve;
    a rear sleeve coaxially connected with the front sleeve and having
        a front end protruding into the rear end of the front sleeve;
        an outer flange formed on and around an outer sidewall of the rear sleeve, radially extending, and having an outer peripheral edge;
        at least one mounting recess formed in the outer peripheral edge of the outer flange, and each of the at least one mounting recess radially extending and corresponding in position to one of the positioning recesses of the front sleeve; and
        an outer thread formed on the outer sidewall of the rear sleeve, disposed between the outer flange and the front end of the rear sleeve, and engaging with the inner thread of the front sleeve;
    a snapping assembly mounted in the front sleeve and the rear sleeve; and
    a retaining assembly mounted around the outer sidewall of the rear sleeve, disposed between the outer flange and a rear end of the rear sleeve, and including
        a locking ring mounted around the rear sleeve and having
            a front end edge facing toward the outer flange of the rear sleeve; and
            at least one engaging tooth axially protruding from the front end edge of the locking ring, and each of the at least one engaging tooth mounted through a corresponding one of the at least one mounting recess of the rear sleeve and engaging in the positioning recess that corresponds in position to the corresponding one of the at least one mounting recess;
        a stop ring stationarily mounted around the rear sleeve; and
        an outer spring being a compression spring, mounted around the rear sleeve, and disposed between the locking ring and the stop ring, and the outer spring having two opposite ends respectively abutting against the locking ring and the stop ring.

2. The snapping device as claimed in claim 1, wherein the snapping assembly including
    a jaw set mounted in the front sleeve and disposed at a front end of the front sleeve;
    a guiding rod mounted in the front sleeve and the rear sleeve and having
        a head portion formed on a front end of the guiding rod and abutting the jaw set; and
        a mounting channel axially defined in the guiding rod and formed through the front end of the guiding rod and a rear end of the guiding rod;
    a stopper mounted in the rear sleeve, disposed at the rear end of the rear sleeve, and having a through hole, and the through hole axially defined through the stopper and aligning with the mounting channel of the guiding rod; and
    an inner spring being a compression spring, mounted in the rear sleeve, and mounted around the rear end of the guiding rod, and the inner spring having two opposite ends respectively abutting against the head portion of the guiding rod and the stopper.

3. The snapping device as claimed in claim 1, wherein
    the rear sleeve further has an annular groove formed in and around the outer sidewall of the rear sleeve and disposed between the outer flange and the rear end of the rear sleeve; and
    the stop ring of the retaining assembly engages in the annular groove of the rear sleeve.

4. The snapping device as claimed in claim 2, wherein
    the rear sleeve further has an annular groove formed in and around the outer sidewall of the rear sleeve and disposed between the outer flange and the rear end of the rear sleeve; and
    the stop ring of the retaining assembly engages in the annular groove of the rear sleeve.

5. The snapping device as claimed in claim 3, wherein the stop ring of the retaining assembly is a C-clip.

6. The snapping device as claimed in claim 4, wherein the stop ring of the retaining assembly is a C-clip.

* * * * *